United States Patent
Devers et al.

(10) Patent No.: US 11,992,826 B2
(45) Date of Patent: *May 28, 2024

(54) METHOD FOR REGENERATING A CATALYST WHICH IS SPENT AND REGENERATED BY A HYDRODESULFURIZATION PROCESS OF GASOLINES

(71) Applicant: IFP Energies nouvelles, Rueil-Malmaison (FR)

(72) Inventors: Elodie Devers, Rueil-Malmaison (FR); Etienne Girard, Rueil-Malmaison (FR); Philibert Leflaive, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 204 days.

This patent is subject to a terminal disclaimer.

(21) Appl. No.: 17/414,725

(22) PCT Filed: Dec. 10, 2019

(86) PCT No.: PCT/EP2019/084437
§ 371 (c)(1),
(2) Date: Jun. 16, 2021

(87) PCT Pub. No.: WO2020/126676
PCT Pub. Date: Jun. 25, 2020

(65) Prior Publication Data
US 2022/0040680 A1 Feb. 10, 2022

(30) Foreign Application Priority Data

Dec. 18, 2018 (FR) ..................................... 1873239

(51) Int. Cl.
| | | |
|---|---|---|
| *B01J 23/882* | (2006.01) | |
| *B01J 23/94* | (2006.01) | |
| *B01J 27/16* | (2006.01) | |
| *B01J 35/10* | (2006.01) | |
| *B01J 35/61* | (2024.01) | |
| *B01J 37/02* | (2006.01) | |
| *B01J 38/02* | (2006.01) | |
| *B01J 38/12* | (2006.01) | |
| *B01J 38/52* | (2006.01) | |
| *C10G 45/04* | (2006.01) | |

(52) U.S. Cl.
CPC .............. *B01J 23/94* (2013.01); *B01J 23/882* (2013.01); *B01J 27/16* (2013.01); *B01J 35/613* (2024.01); *B01J 35/615* (2024.01); *B01J 38/02* (2013.01); *B01J 38/12* (2013.01); *B01J 38/52* (2013.01); *C10G 45/04* (2013.01); *C10G 2300/207* (2013.01); *C10G 2300/4081* (2013.01); *C10G 2300/706* (2013.01)

(58) Field of Classification Search
CPC . B01J 23/882; B01J 23/94; B01J 27/16; B01J 38/02; B01J 38/12; B01J 38/52
See application file for complete search history.

(56) References Cited

U.S. PATENT DOCUMENTS

| | | | |
|---|---|---|---|
| 4,762,814 A | * | 8/1988 | Parrott ................ B01J 23/8873 502/220 |
| 2009/0261019 A1 | | 10/2009 | McCarthy et al. |
| 2018/0133706 A1 | | 5/2018 | Carrette |
| 2018/0318822 A1 | * | 11/2018 | Bai ...................... B01J 37/0203 |

FOREIGN PATENT DOCUMENTS

| | | | | |
|---|---|---|---|---|
| EP | 2875864 A1 | * | 5/2015 | .............. B01J 21/04 |
| FR | 3035600 A1 | | 11/2016 | |
| JP | 2007507334 A | * | 3/2007 | |
| JP | 2014050838 A | * | 3/2014 | |
| WO | 2009126319 A1 | | 10/2009 | |
| WO | WO-2015158846 A1 | * | 10/2015 | ............ B01J 23/881 |

OTHER PUBLICATIONS

International Search Report for PCT/EP2019/084437 dated Feb. 6, 2020.

* cited by examiner

*Primary Examiner* — Jun Li
(74) *Attorney, Agent, or Firm* — Millen, White, Zelano & Branigan, P.C.; Csaba Henter

(57) ABSTRACT

A process for rejuvenating an at least partially spent catalyst resulting from a hydrodesulfurization process of a sulfur-containing olefinic gasoline cut, where the at least partially spent catalyst result is from a fresh catalyst a metal from group VIII, a metal from group VIb, and an oxide support, where the process includes
  a) regenerating the at least partially spent catalyst in an oxygen-containing gas stream at a temperature between 350° C. and 550° C.,
  b) the regenerated catalyst is brought into contact with an impregnation solution containing a compound containing a metal from group VIb, the molar ratio of the metal from group VIb added per metal from group VIb already present in the regenerated catalyst being between 0.15 and 2.5 mol/mol,
  c) a drying stage is carried out at a temperature of less than 200° C., and
the use of the rejuvenated catalyst in a hydrodesulfurization process.

14 Claims, No Drawings

METHOD FOR REGENERATING A CATALYST WHICH IS SPENT AND REGENERATED BY A HYDRODESULFURIZATION PROCESS OF GASOLINES

FIELD OF THE INVENTION

The present invention relates to a process for the rejuvenation of a catalyst used in a process for the hydrodesulfurization of a gasoline cut and to the use of the rejuvenated catalyst in such a process.

STATE OF THE ART

Sulfur is an element naturally present in crude oil and is thus present in gasoline and diesel fuel if it is not removed during refining. However, sulfur in gasoline interferes with the efficiency of emission reduction systems (catalytic converters) and contributes to air pollution. In order to combat environmental pollution, all countries are consequently gradually adopting strict sulfur specifications, the specifications being, for example, 10 ppm (weight) of sulfur in commercial gasolines in Europe, China, the United States and Japan. The problem of reducing sulfur contents is essentially focused on gasolines obtained by cracking, whether catalytic (FCC, Fluid Catalytic Cracking) or non-catalytic (coking, visbreaking, steam cracking), the main precursors of sulfur in gasoline pools.

One solution, well known to a person skilled in the art, for reducing the sulfur content consists in carrying out a hydrotreating (or hydrodesulfurization) of the hydrocarbon cuts (and in particular of catalytic cracking gasolines) in the presence of hydrogen and of a heterogeneous catalyst. However, this process exhibits the major disadvantage of causing a very significant drop in the octane number if the catalyst employed is not sufficiently selective. This reduction in the octane number is linked in particular to the hydrogenation of the olefins present in this type of gasoline concomitantly with the hydrodesulfurization.

Unlike other hydrotreating processes, in particular those for feedstocks of gas oil type, the hydrodesulfurization of gasolines thus has to make it possible to respond to a double antagonistic constraint: to provide extreme hydrodesulfurization of gasolines and to limit the hydrogenation of the unsaturated compounds present.

The most widely used route for responding to the double problem mentioned above consists in employing processes in which the sequence of unit stages makes it possible simultaneously to maximize the hydrodesulfurization while limiting the hydrogenation of the olefins. Thus, the most recent processes, such as the Prime G+ (trademark) process, make it possible to desulfurize cracked gasolines rich in olefins, while limiting the hydrogenation of the mono-olefins and consequently the loss of octane and the high hydrogen consumption which results therefrom. Such processes are, for example, described in the patent applications EP 1 077 247 and EP 1 174485.

Obtaining the desired reaction selectivity (ratio of hydrodesulfurization to hydrogenation of olefins) can thus be partly due to the choice of the process but, in all cases, the use of an intrinsically selective catalytic system is very often a key factor. In general, the catalysts used for this type of application are catalysts of sulfide type containing an element from group VIb (Cr, Mo, W) and an element from group VIII (Fe, Ru, Os, Co, Rh, Ir, Pd, Ni, Pt). Thus, in the patent U.S. Pat. No. 5,985,136, it is claimed that a catalyst exhibiting a surface concentration of between $0.5 \times 10^{-4}$ and $3 \times 10^{-4}$ g of $MoO_3/m^2$ makes it possible to achieve high selectivities in hydrodesulfurization (93% hydrodesulfurization (HDS) against 33% hydrogenation of olefins (HOO)). Furthermore, according to the patents U.S. Pat. Nos. 4,140,626 and 4,774,220, it can be advantageous to add a dopant (alkali metal, alkaline earth metal) to the conventional sulfide phase (CoMoS) with the aim of limiting the hydrogenation of olefins. The documents U.S. Pat. No. 8,637,423 and EP 1 892 039, which describe selective hydrodesulfurization catalysts, are also known in the state of the art.

During its use for the hydrotreating of a petroleum cut, a hydrotreating catalyst experiences a decrease in its activity due to the deposition of coke and/or of compounds which are sulfur-based or contain other heteroelements. Beyond a certain period, its replacement is thus necessary. In particular, the tightening of the sulfur specifications of fuels induces an increase in the frequency of replacement of the catalyst, which leads to an increase in the cost associated with the catalyst and to an increase in the amount of spent catalyst.

In order to combat these disadvantages, the regeneration (gentle calcination) of catalysts for the hydrodesulfurization of middle distillates (gas oil) or of spent residues is an economically and ecologically advantageous process because it makes it possible to use these catalysts again in industrial units rather than to landfill them or to recycle them (recovery of the metals). However, the regenerated catalysts are generally less active than the starting solids.

In order to overcome the shortfall in hydrodesulfurizing activity of the regenerated catalyst, it is possible to apply an additional "rejuvenation" treatment. The rejuvenation process consists in reimpregnating the regenerated catalyst with a solution containing metal precursors in the presence of organic or inorganic additives. These "rejuvenation" processes are well known to a person skilled in the art in the field of middle distillates. Many patents, such as, for example, U.S. Pat. Nos. 7,906,447, 8,722,558, 7,956,000, 7,820,579 or also CN102463127, thus provide different methods for carrying out the rejuvenation of the catalysts for the hydrotreating of middle distillates. The document US2017/036202 describes an increase in activity in a diesel hydrotreating process when a metal from group VIb and phosphorus are added to a regenerated catalyst. Catalysts for the hydrodesulfurization of middle distillates, which have high contents of metals in comparison with the catalysts for the selective hydrodesulfurization of gasolines, experience significant sintering during use and during regeneration. Thus, the rejuvenation treatments are focused on the dissolution and the redistribution of the metal phases in order to recover a dispersion close to the fresh catalyst and therefore an activity close to the fresh catalyst. Current methods for the rejuvenation of hydrotreating catalysts have been developed for restoring only the hydrodesulfurizing activity of the catalysts for the hydrodesulfurization of middle distillates.

Catalysts for the selective hydrodesulfurization of cracked gasolines exhibit different rejuvenation issues from catalysts for the hydrotreating of gas oils, in particular due to the need to maintain the selective nature of the catalyst with respect to reactions for hydrodesulfurization and hydrogenation of olefins. This is because an increase in the selectivity is generally more desirable than an increase in or maintenance of the activity in the field of gasolines. There is thus a great advantage in developing a specific rejuvenation process for catalysts for the selective hydrodesulfurization of gasolines.

Such a rejuvenation process is described for a spent catalyst for the selective hydrodesulfurization of FCC gasolines in the patent CN105642312. This complex process employs, in addition to an organic agent, one or more metal additives containing at least one element chosen from Na, K, Mg, Ca, Cu and Zn; and a heat treatment with an atmosphere having the oxygen content controlled.

There thus exists today a keen interest among manufacturers and regenerators of catalysts, and refiners, for a process for the rejuvenation of hydrodesulfurization catalysts, in particular catalysts for the hydrodesulfurization of gasoline cuts, which exhibit catalytic performance qualities which are maintained or even improved, in particular in terms of catalytic activity in hydrodesulfurization and/or of selectivity and which thus, once employed, make it possible to produce a gasoline having a low sulfur content without severe reduction in the octane number.

The present invention thus relates to a "rejuvenation" process suitable for selective hydrodesulfurization catalysts, the object of which is the full recovery of the hydrodesulfurizing activity of the catalyst and the maintenance of the selectivity of the fresh catalyst, indeed even their improvements.

Subject Matters of the Invention

The invention relates to a process for the rejuvenation of an at least partially spent catalyst resulting from a process for the hydrodesulfurization of a sulfur-containing olefinic gasoline cut, said at least partially spent catalyst resulting from a fresh catalyst comprising at least one metal from group VIII, at least one metal from group VIb, an oxide support, and optionally phosphorus, said process comprising the following stages:
 a) the at least partially spent catalyst is regenerated in an oxygen-containing gas stream at a temperature of between 350° C. and 550° C. so as to obtain a regenerated catalyst,
 b) the regenerated catalyst is brought into contact with at least one impregnation solution containing at least one compound comprising a metal from group VIb, the molar ratio of the metal from group VIb added per metal from group VIb already present in the regenerated catalyst being between 0.15 and 2.5 mol/mol,
 c) a drying stage is carried out at a temperature of less than 200° C. so as to obtain a rejuvenated catalyst.

This is because it has been observed that the rejuvenation process according to the invention makes it possible to obtain a rejuvenated catalyst showing an improved catalytic activity, compared with the use of the same fresh catalyst, and surprisingly induces an improvement in the selectivity in a process for the selective hydrodesulfurization of gasolines. Without being committed to any theory, it seems that the changes to the active phase caused by the rejuvenation of the regenerated catalyst induce a better selectivity toward the hydrodesulfurization reaction of the active sites and make it possible to compensate for the reduction in the number of these sites and thus maintain the activity of the catalyst.

According to one alternative form, in stage b), the impregnation solution additionally contains a compound comprising a metal from group VIII; the molar ratio of the metal from group VIII added per metal from group VIII already present in the regenerated catalyst is between 0.1 and 2.5 mol/mol.

According to one alternative form, in stage b), the impregnation solution additionally contains phosphorus; the molar ratio of the phosphorus added per metal from group VIb already present in the regenerated catalyst is between 0.1 and 2.5 mol/mol.

According to one alternative form, in stage b), the impregnation solution additionally contains an organic compound containing oxygen and/or nitrogen and/or sulfur; the molar ratio of the organic compound added per metal from group VIb already present in the regenerated catalyst is between 0.01 and 5 mol/mol.

According to one alternative form, the organic compound containing oxygen and/or nitrogen and/or sulfur is chosen from a compound comprising one or more chemical functional groups chosen from a carboxylic, alcohol, thiol, thioether, sulfone, sulfoxide, ether, aldehyde, ketone, ester, carbonate, amine, nitrile, imide, oxime, urea or amide functional group or also compounds including a furan ring or also sugars.

According to one alternative form, the organic compound containing oxygen and/or nitrogen and/or sulfur is chosen from γ-valerolactone, 2-acetylbutyrolactone, triethylene glycol, diethylene glycol, ethylene glycol, ethylenediaminetetraacetic acid, maleic acid, malonic acid, citric acid, gluconic acid, di($C_1$-$C_4$ alkyl) succinate, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicine, tricine, 2-furaldehyde, 5-hydroxymethylfurfural, 2-acetylfuran, 5-methyl-2-furaldehyde, ascorbic acid, butyl lactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

According to one alternative form, the regeneration stage a) is preceded by a deoiling stage which comprises bringing the at least partially spent catalyst into contact with a stream of inert gas at a temperature of between 300° C. and 400° C.

According to one alternative form, on conclusion of the drying stage c), a calcination stage d) is carried out at a temperature of between 200° C. and 600° C.

According to one alternative form, the fresh catalyst has a content of metal from group VIb of between 1% and 20% by weight of oxide of said metal from group VIb, with respect to the total weight of the catalyst.

According to one alternative form, the fresh catalyst has a content of metal from group VIII of between 0.1% and 10% by weight of oxide of said metal from group VIII, with respect to the total weight of the catalyst.

According to one alternative form, the fresh catalyst has a phosphorus content of between 0.3% and 10% by weight, expressed as $P_2O_5$, with respect to the total weight of the catalyst and the phosphorus/(metal from group VIb) molar ratio in the catalyst is between 0.1 and 0.7.

According to one alternative form, the oxide support of the fresh catalyst is chosen from aluminas, silica, silica-aluminas or also titanium or magnesium oxides, used alone or as a mixture with alumina or silica-alumina.

According to one alternative form, the fresh catalyst is characterized by a specific surface of between 20 and 200 m²/g, preferably of between 30 and 180 m²/g.

The present invention also relates to a process for the hydrodesulfurization of a sulfur-containing olefinic gasoline cut in which said gasoline cut, hydrogen and the catalyst rejuvenated according to the process of the invention are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of catalyst, of between 1 and 10 h$^{-1}$ and a hydrogen/gasoline feedstock ratio by volume of between 100 and 1200 Sl/l.

According to one alternative form, the rejuvenated catalyst is subjected to a sulfidation stage before or during the hydrodesulfurization process.

According to one alternative form, the hydrodesulfurization process is carried out in a catalytic bed of a reactor of the fixed bed type containing several catalytic beds; at least one other catalytic bed upstream or downstream of the catalytic bed containing the rejuvenated catalyst in the direction of the circulation of the feedstock contains at least in part a fresh catalyst and/or a regenerated catalyst.

According to one alternative form, the hydrodesulfurization process is carried out in at least two reactors in series of the fixed bed type or of the ebullated bed type; at least one of the reactors contains a rejuvenated catalyst while another reactor contains a fresh catalyst or a regenerated catalyst, or a mixture of a rejuvenated catalyst and of a fresh and/or regenerated catalyst, in any order, with or without removal of at least a part of the H$_2$S from the effluent resulting from the first reactor before treating said effluent in the second reactor.

Subsequently, the groups of chemical elements are given according to the CAS classification (CRC Handbook of Chemistry and Physics, published by CRC Press, editor D. R. Lide, 81$^{st}$ edition, 2000-2001). For example, group VIII according to the CAS classification corresponds to the metals from columns 8, 9 and 10 according to the new IUPAC classification.

DESCRIPTION OF THE INVENTION

The rejuvenated catalyst obtained by the process according to the invention results from an at least partially spent catalyst, itself resulting from a fresh catalyst, which has been used in a process for the hydrodesulfurization of a sulfur-containing olefinic gasoline cut under the conditions as described below for a certain period of time and which exhibits a significantly lower activity than the fresh catalyst, which necessitates its replacement.

The fresh catalyst used in a process for the hydrodesulfurization of a sulfur-containing olefinic gasoline cut is known to a person skilled in the art. It comprises at least one metal from group VIII, at least one metal from group VIb, an oxide support and optionally phosphorus and/or an organic compound as described below. According to another alternative form, the fresh catalyst does not comprise phosphorus.

The preparation of the fresh catalyst is known and generally comprises a stage of impregnation of the metals from group VIII and from group VIb and optionally of phosphorus and/or of the organic compound on the oxide support, followed by a drying operation, then by an optional calcination making it possible to obtain the active phase in their oxide forms. Before its use in a process for the hydrodesulfurization of a sulfur-containing olefinic gasoline cut, the fresh catalyst is generally subjected to a sulfidation in order to form the active entity as described below.

According to an alternative form of the invention, the fresh catalyst has not undergone calcination during its preparation, that is to say that the impregnated catalytic precursor has not been subjected to a stage of heat treatment at a temperature of greater than 200° C. under an inert atmosphere or under an oxygen-containing atmosphere, in the presence or absence of water.

According to another, preferred, alternative form of the invention, the fresh catalyst has undergone a calcination stage during its preparation, that is to say that the impregnated catalytic precursor has been subjected to a stage of heat treatment at a temperature of between 250° C. and 1000° C. and preferably between 200° C. and 750° C., for a period of time typically of between 15 minutes and 10 hours, under an inert atmosphere or under an oxygen-containing atmosphere, in the presence or absence of water.

The metal from group VIb present in the active phase of the fresh catalyst is preferentially chosen from molybdenum and tungsten. The metal from group VIII present in the active phase of the fresh catalyst is preferentially chosen from cobalt, nickel and the mixture of these two elements. The active phase of the fresh catalyst is preferably chosen from the group formed by the combination of the elements nickel-molybdenum, cobalt-molybdenum and nickel-cobalt-molybdenum and very preferably the active phase consists of cobalt and molybdenum.

The content of metal from group VIII is between 0.1% and 10% by weight of oxide of the metal from group VIII, with respect to the total weight of the fresh catalyst, preferably of between 0.6% and 8% by weight, preferably of between 2% and 7%, very preferably of between 2% and 6% by weight and more preferably still of between 2.5% and 6%.

The content of metal from group VIb is between 1% and 20% by weight of oxide of the metal from group VIb, with respect to the total weight of the fresh catalyst, preferably of between 2% and 18% by weight, very preferably of between 3% and 16% by weight.

The metal from group VIII to metal from group VIb molar ratio of the fresh catalyst is generally between 0.1 and 0.8, preferably between 0.2 and 0.6.

In addition, the fresh catalyst exhibits a density of metal from group VIb, expressed as number of atoms of said metal per unit area of the catalyst, which is between 0.5 and 30 atoms of metal from group VIb per nm$^2$ of catalyst, preferably between 2 and 25, more preferably still between 3 and 15. The density of metal from group VIb, expressed as number of atoms of metal from group VIb per unit area of the catalyst (number of atoms of metal from group VIb per nm$^2$ of catalyst), is calculated, for example, from the following relationship:

$$d(\text{metal from group } VIb) = \frac{(X \times N_A)}{(100 \times 10^{18} \times S \times M_M)}$$

with:
X=% by weight of metal from group VIb;
N$_A$=Avogadro's number, equal to 6.022×10$^{23}$;
S=Specific surface of the catalyst (m$^2$/g), measured according to the standard ASTM D3663;
M$_M$=Molar mass of the metal from group VIb (for example 95.94 g/mol for molybdenum).

For example, if the catalyst contains 20% by weight of molybdenum oxide MoO$_3$ (i.e. 13.33% by weight of Mo) and has a specific surface of 100 m$^2$/g, the density d(Mo) is equal to:

$$d(Mo) = \frac{(13.33 \times N_A)}{(100 \times 10^{18} \times 100 \times 96)} = 8.4 \text{ atoms of } Mo/\text{nm}^2 \text{ of catalyst}$$

The catalysts for the hydrodesulfurization of gasolines differ generally from the catalysts for the hydrodesulfurization of middle distillates of gas oil type in a higher density of metal from group VIb. This is because, even if the catalysts for the hydrodesulfurization of gasolines generally have lower contents of metal from group VIb than the catalysts for middle distillates, the specific surfaces of the gasoline catalysts are much higher than those of the catalysts for middle distillates (generally greater than 200 m$^2$/g), which results in a higher density of metal from group VIb.

Optionally, the fresh catalyst can additionally exhibit a phosphorus content generally of between 0.3% and 10% by weight of $P_2O_5$, with respect to the total weight of fresh catalyst, preferably between 0.5% and 5% by weight, very preferably between 1% and 3% by weight. For example, the phosphorus present in the fresh catalyst is combined with the metal from group VIb and optionally also with the metal from group VIII in the form of heteropolyanions.

Furthermore, the phosphorus/(metal from group VIb) molar ratio is generally between 0.1 and 0.7, preferably between 0.2 and 0.6, when phosphorus is present.

Preferably, the fresh catalyst is characterized by a specific surface of between 5 and 400 m$^2$/g, preferably of between 10 and 250 m$^2$/g, preferably of between 20 and 200 m$^2$/g, very preferably of between 30 and 180 m$^2$/g. The specific surface is determined in the present invention by the BET method according to the standard ASTM D3663, as described in the work by Rouquerol F., Rouquerol J. and Singh K., *Adsorption by Powders & Porous Solids: Principle, Methodology and Applications*, Academic Press, 1999, for example by means of an Autopore III™ model device of the Micromeritics™ brand.

The pore volume of the fresh catalyst is generally between 0.4 cm$^3$/g and 1.3 cm$^3$/g, preferably between 0.6 cm$^3$/g and 1.1 cm$^3$/g. The total pore volume is measured by mercury porosimetry according to the standard ASTM D4284 with a wetting angle of 140°, as described in the same work.

The tapped bulk density (TBD) of the fresh catalyst is generally between 0.4 and 0.7 g/ml, preferably between 0.45 and 0.69 g/ml. The TBD measurement consists in introducing the catalyst into a measuring cylinder, the volume of which has been determined beforehand, and then, by vibration, in tapping it until a constant volume is obtained. The bulk density of the tapped product is calculated by comparing the mass introduced and the volume occupied after tapping.

The fresh catalyst can be in the form of cylindrical or multilobe (trilobe, quadrilobe, and the like) extrudates with a small diameter, or of spheres.

The oxide support of the fresh catalyst is usually a porous solid chosen from the group consisting of: aluminas, silica, silica-aluminas and also titanium and magnesium oxides, used alone or as a mixture with alumina or silica-alumina. It is preferably chosen from the group consisting of silica, the family of the transition aluminas and silica-aluminas; very preferably, the oxide support is constituted essentially of at least one transition alumina, that is to say that it comprises at least 51% by weight, preferably at least 60% by weight, very preferably at least 80% by weight, indeed even at least 90% by weight, of transition alumina. It preferably consists solely of a transition alumina. Preferably, the oxide support of the fresh catalyst is a "high temperature" transition alumina, that is to say which contains theta-, delta-, kappa- or alpha-phase aluminas, alone or as a mixture, and an amount of less than 20% of gamma-, chi- or eta-phase alumina.

The fresh catalyst can also additionally comprise at least one organic compound containing oxygen and/or nitrogen and/or sulfur before sulfidation. Such additives are described subsequently.

During the hydrotreating process, coke and sulfur as well as other contaminants resulting from the feedstock, such as silicon, arsenic or chlorine, are formed and/or deposited on the catalyst and transform the fresh catalyst into an at least partially spent catalyst.

The at least partially spent catalyst is thus composed of the oxide support and of the active phase formed of at least one metal from group VIb and of at least one metal from group VIII and optionally of the phosphorus from the fresh catalyst, as well as carbon, sulfur and optionally other contaminants resulting from the feedstock, such as silicon, arsenic and chlorine.

The contents of metal from group VIb, of metal from group VIII and of phosphorus in the fresh, at least partially spent, regenerated or rejuvenated catalyst are expressed as oxides after correction for the loss on ignition of the catalyst sample in a muffle furnace for two hours at 550° C. The loss on ignition is due to the loss of moisture, carbon, sulfur and/or other contaminants. It is determined according to ASTM D7348.

The contents of metal from group VIb, of metal from group VIII and optionally of phosphorus in the at least partially spent catalyst are substantially identical to the contents of the fresh catalyst from which it results.

An at least partially spent catalyst is understood to mean a catalyst which exits from a process for the hydrodesulfurization of a sulfur-containing olefinic gasoline cut carried out under the conditions as described below, and which has not undergone heat treatment under a gas containing air or oxygen at a temperature of greater than 200° C. It may have undergone a deoiling.

It will be noted that the term "coke" or "carbon" in the present patent application denotes a substance based on hydrocarbons which is deposited on the surface of the catalyst during its use, which is highly cyclized and condensed and which has an appearance similar to graphite.

The at least partially spent catalyst contains in particular carbon at a content generally of greater than or equal to 2% by weight, preferably of between 2% and 10% by weight and more preferably still of between 2.2% and 6% by weight, with respect to the total weight of the at least partially spent catalyst. This carbon content is measured by elemental analysis according to ASTM D5373.

The at least partially spent catalyst contains sulfur at a content of between 1% and 8% by weight, with respect to the total weight of the at least partially spent catalyst, preferentially of between 1% and 6.0% by weight and particularly preferably between 2% and 5% by weight. This residual sulfur content in the at least partially spent catalyst is measured by elemental analysis according to ASTM D5373.

Optionally, the at least partially spent catalyst can additionally exhibit a low content of contaminants resulting from the feedstock treated by the fresh catalyst from which it originates, such as silicon, arsenic or chlorine.

Preferably, the content of silicon (besides that possibly present on the fresh catalyst) is less than 2% by weight and very preferably less than 1% by weight, with respect to the total weight of the at least partially spent catalyst.

Preferably, the arsenic content is less than 2000 ppm by weight and very preferably less than 500 ppm by weight, with respect to the total weight of the at least partially spent catalyst.

Preferably, the chlorine content is less than 2000 ppm by weight and very preferably less than 500 ppm by weight, with respect to the total weight of the at least partially spent catalyst.

Regeneration (Stage a)

The process for the rejuvenation according to the invention of the at least partially spent catalyst comprises a stage of removal of the coke and sulfur (regeneration stage). This is because, according to stage a) of the process according to the invention, the at least partially spent catalyst is regenerated in an oxygen-containing gas stream at a temperature of between 350° C. and 550° C. so as to obtain a regenerated catalyst.

Even if this is possible, the regeneration is preferably not carried out by keeping the charged catalyst in the hydrotreating reactor (in situ regeneration). Preferably, the at least partially spent catalyst is thus extracted from the reactor and sent to a regeneration plant in order to carry out the regeneration in said plant (ex situ regeneration).

The regeneration stage a) is preferably preceded by a deoiling stage. The deoiling stage generally comprises bringing the at least partially spent catalyst into contact with a stream of inert gas (that is to say essentially devoid of oxygen), for example in a nitrogen atmosphere or the like, at a temperature of between 300° C. and 400° C., preferably of between 300° C. and 350° C. The inert gas flow rate in terms of flow rate per unit volume of the catalyst is from 5 to 150 $Sl \cdot l^{-1} \cdot h^{-1}$ for 3 to 7 hours.

In an alternative form, the deoiling stage can be carried out by light hydrocarbons, by steam treatment or any other analogous process.

The deoiling stage makes it possible to remove the soluble hydrocarbons and thus to release the porosity of the at least partially spent catalyst necessary for the rejuvenation.

The regeneration stage a) is generally carried out in an oxygen-comprising gas stream, generally air. The water content is generally between 0% and 50% by weight. The gas flow rate in terms of flow rate per unit of volume of the at least partially spent catalyst is preferably from 20 to 2000 $Sl \cdot l^{-1} \cdot h^{-1}$, more preferably from 30 to 1000 $Sl \cdot l^{-1} \cdot h^{-1}$ and particularly preferably from 40 to 500 $Sl \cdot l^{-1} \cdot h^{-1}$. The duration of the regeneration is preferably 2 hours or more, more preferably 2.5 hours or more and particularly preferably 3 hours or more. The regeneration of the at least partially spent catalyst is generally carried out at a temperature of between 350° C. and 550° C., preferably of between 360° C. and 500° C.

The regenerated catalyst is thus composed of the oxide support and of the active phase formed of at least one metal from group VIb and of at least one metal from group VIII and optionally of the phosphorus from the fresh catalyst, and also of the residual carbon, of the residual sulfur and optionally of other contaminants resulting from the feedstock, such as silicon, arsenic and chlorine.

The contents of metal from group VIb, of metal from group VIII and optionally of phosphorus in the regenerated catalyst are substantially identical to the contents of the at least partially spent catalyst and to the contents of the fresh catalyst from which it results.

The regenerated catalyst obtained in the regeneration stage contains residual carbon at a content preferably of less than 2% by weight, preferably of between 0.1% and 1.9% by weight, with respect to the total weight of the regenerated catalyst, preferentially of between 0.1% and 1.5% by weight and particularly preferably between 0.1% and 1.0% by weight. The regenerated catalyst may also not contain residual carbon.

It should be noted that the term "residual carbon" in the present patent application means carbon (coke) remaining in the regenerated catalyst after regeneration of the at least partially spent catalyst. This content of residual carbon in the regenerated catalyst is measured by elemental analysis according to ASTM D5373.

The regenerated catalyst obtained in the regeneration stage contains residual sulfur (before the optional sulfidation) at a content of less than 5% by weight, preferably of between 0.1% and 4.9% by weight, with respect to the total weight of the regenerated catalyst, preferentially of between 0.1% and 2.0% by weight and particularly preferably between 0.2% and 0.8% by weight. The regenerated catalyst may also not contain residual sulfur.

This content of residual sulfur in the regenerated catalyst is measured by elemental analysis according to ASTM D5373.

Rejuvenation (Stage b)

The rejuvenation process according to the invention comprises, after the regeneration stage a), a rejuvenation stage b) according to which the regenerated catalyst is brought into contact with at least one impregnation solution containing at least one compound comprising a metal from group VIb, the molar ratio of the metal from group VIb added per metal from group VIb already present in the regenerated catalyst being between 0.15 and 2.5 mol/mol, preferably between 0.2 and 2.0 mol/mol and more preferably still between 0.3 and 1.0 mol/mol.

This is because, during the use of the catalyst in the process for the hydrodesulfurization of gasolines, the pores of the support become blocked overtime and the active phase containing the metals becomes increasingly inaccessible. A decrease in the catalytic activity, which is not completely regained even after regeneration, is thus observed. In order to overcome the deficit in hydrodesulfurizing activity, it is possible to reimpregnate the catalyst with a solution containing a compound comprising a metal from group VIb and optionally also a compound comprising a metal from group VIII and/or phosphorus in order to limit the drop in activity and, surprisingly, to increase the selectivity.

According to a first alternative form, the rejuvenation stage b) can also comprise bringing the regenerated catalyst into contact with an impregnation solution containing a compound comprising a metal from group VIII, in addition to the compound comprising a metal from group VIb.

In this case, the molar ratio of the metal from group VIII added per metal from group VIII already present in the regenerated catalyst is between 0.1 and 2.5 mol/mol, preferably between 0.1 and 2.0 mol/mol and more preferably still between 0.1 and 1.0 mol/mol.

According to a preferred alternative form of this first alternative form, the impregnation solution contains only the compound(s) comprising a metal from group VIb and the compound(s) comprising a metal from group VIII, in addition to the solvent(s).

The metal from group VIb introduced is preferentially chosen from molybdenum and tungsten. The metal from group VIII introduced is preferentially chosen from cobalt, nickel and the mixture of these two elements. Preferably, the combination of the elements nickel-molybdenum, cobalt-molybdenum and nickel-cobalt-molybdenum and very preferably the cobalt-molybdenum combination is chosen.

By way of example, use may be made, among the sources of molybdenum, of the oxides and hydroxides, molybdic acids and their salts, in particular the ammonium salts, such as ammonium molybate, ammonium heptmolybdate, phosphomolybdic acid ($H_3PMo_{12}O_{40}$), and their salts, and optionally silicomolybdic acid ($H_4SiMo_{12}O_{40}$) and its salts. The sources of molybdenum can also be any heteropolycompound of Keggin, lacunary Keggin, substituted Keggin, Dawson, Anderson or Strandberg type, for example. Use is preferably made of molybdenum trioxide and the heteropolycompounds of Keggin, lacunary Keggin, substituted Keggin and Strandberg type.

The tungsten precursors which can be used are also well known to a person skilled in the art. For example, use may be made, among the sources of tungsten, of the oxides and hydroxides, tungstic acids and their salts, in particular the ammonium salts such as ammonium tungstate, ammonium metatungstate, phosphotungstic acid and their salts, and optionally silicotungstic acid ($H_4SiW_{12}O_{40}$) and its salts. The sources of tungsten can also be any heteropolycompound of Keggin, lacunary Keggin, substituted Keggin or Dawson type, for example. Use is preferably made of the oxides and the ammonium salts, such as ammonium metatungstate or the heteropolyanions of Keggin, lacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example. Use is preferably made of nickel hydroxide and nickel hydroxycarbonate.

According to a second alternative form, the rejuvenation stage b) can also comprise bringing the regenerated catalyst into contact with an impregnation solution containing phosphorus, in addition to the compound comprising a metal from group VIb and optionally to the compound comprising a metal from group VIII.

In this case, the molar ratio of the phosphorus added per metal from group VIb already present in the regenerated catalyst is between 0.1 and 2.5 mol/mol, preferably between 0.1 and 2.0 mol/mol and more preferably still between 0.1 and 1.0 mol/mol.

According to a preferred alternative form of this second alternative form, the impregnation solution contains only the compound(s) comprising a metal from group VIb and the compound(s) comprising a metal from group VIII and the phosphorus, preferably in the form of phosphoric acid, in addition to the solvent(s).

The preferred phosphorus precursor is orthophosphoric acid $H_3PO_4$, but its salts and esters, such as ammonium phosphates, are also suitable. The phosphorus can also be introduced at the same time as the element(s) from group VIb in the form of Keggin, lacunary Keggin, substituted Keggin or Strandberg-type heteropolyanions.

Stage b) of bringing said regenerated catalyst into contact with an impregnation solution containing a compound comprising a metal from group VIb and optionally a compound comprising a metal from group VIII and/or phosphorus can be carried out either by slurry impregnation, or by excess impregnation, or by dry impregnation, or by any other means known to a person skilled in the art.

Equilibrium (or excess) impregnation consists in immersing the support or the catalyst in a volume of solution (often considerably) greater than the pore volume of the support or of the catalyst while keeping the system stirred in order to improve the exchanges between the solution and the support or catalyst. An equilibrium is finally reached after diffusion of the different entities into the pores of the support or catalyst. Control of the amount of elements deposited is provided by the prior measurement of an adsorption isotherm which relates the concentration of the elements to be deposited contained in the solution to the amount of the elements deposited on the solid in equilibrium with this solution.

Dry impregnation consists, for its part, in introducing a volume of impregnation solution equal to the pore volume of the support or of the catalyst. Dry impregnation makes it possible to deposit, on a given support or catalyst, all of the metals and additives contained in the impregnation solution.

Stage b) can advantageously be carried out by one or more excess impregnations of solution or preferably by one or more dry impregnations and very preferably by a single dry impregnation of said regenerated catalyst, using the impregnation solution.

According to a third alternative form, the rejuvenation stage b) can also comprise bringing the regenerated catalyst into contact with an impregnation solution containing an organic compound containing oxygen and/or nitrogen and/or sulfur, in addition to the compound comprising a metal from group VIb and optionally to the compound comprising a metal from group VIII and/or to the phosphorus. The function of the additives or organic compounds is to increase the catalytic activity in comparison with the catalysts without additives. Said organic compound is preferentially impregnated on said catalyst after dissolution in aqueous or nonaqueous solution.

In this case, the molar ratio of the organic compound added per metal from group VIb already present in the regenerated catalyst is between 0.01 and 5 mol/mol, preferably between 0.05 and 3 mol/mol, in a preferred way between 0.05 and 2 mol/mol and very preferably between 0.1 and 1.5 mol/mol.

When several organic compounds are present, the different molar ratios apply for each of the organic compounds present.

According to a preferred alternative form of this third alternative form, the impregnation solution contains only the compound(s) comprising a metal from group VIb, the compound(s) comprising a metal from group VIII, the phosphorus, preferably in the form of phosphoric acid, and the organic compound(s), in addition to the solvent(s).

Generally, the organic compound is chosen from a compound comprising one or more chemical functional groups chosen from a carboxylic, alcohol, thiol, thioether, sulfone, sulfoxide, ether, aldehyde, ketone, ester, carbonate, amine, nitrile, imide, oxime, urea and amide functional group or also compounds including a furan ring or also sugars.

The oxygen-containing organic compound can be one or more chosen from compounds comprising one or more chemical functional groups chosen from a carboxylic, alcohol, ether, aldehyde, ketone, ester or carbonate functional group or also compounds including a furan ring or also sugars. By way of example, the oxygen-containing organic compound can be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, maleic acid, malic acid, malonic acid, oxalic acid, gluconic acid, tartaric acid, citric acid, γ-ketovaleric acid, a di($C_1$-$C_4$ alkyl) succinate and more particularly dimethyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, fructose, sucrose, sorbitol, xylitol, γ-valerolactone, 2-acetylbutyrolactone, propylene carbonate, 2-furaldehyde (also known as furfural), 5-hydroxymethylfurfural (also known under the name 5-(hydroxymethyl)-2-furaldehyde or 5-HMF), 2-acetylfuran, 5-methyl-2-furaldehyde, methyl 2-furoate, furfuryl alcohol (also known under the name furfuranol), furfuryl acetate, ascorbic acid, butyl lactate, butyl butyryllactate, ethyl 3-hydroxybutanoate, ethyl 3-ethoxypropanoate, methyl 3-methoxypropanoate, 2-ethoxyethyl acetate, 2-butoxyethyl acetate, 2-hydroxyethyl acrylate, 2-hydroxyethyl methacrylate and 5-methyl-2(3H)-furanone.

The nitrogen-containing organic compound can be one or more chosen from compounds comprising one or more chemical functional groups chosen from an amine or nitrile functional group. By way of example, the nitrogen-containing organic compound can be one or more chosen from the group consisting of ethylenediamine, diethylenetriamine, hexamethylenediamine, triethylenetetramine, tetraethylenepentamine, pentaethylenehexamine, acetonitrile, octylamine, guanidine and a carbazole.

The organic compound containing oxygen and nitrogen can be one or more chosen from compounds comprising one or more chemical functional groups chosen from a carboxylic, alcohol, ether, aldehyde, ketone, ester, carbonate, amine, nitrile, imide, amide, urea or oxime functional group. By way of example, the organic compound containing oxygen and nitrogen can be one or more choose from the group consisting of 1,2-cyclohexanediaminetetraacetic acid, monoethanolamine (MEA), 1-methyl-2-pyrrolidinone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DTPA), tetramethylurea, glutamic acid, dimethylglyoxime, bicine, tricine, 2-methoxyethyl cyanoacetate, 1-ethyl-2-pyrrolidinone, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 1-methyl-2-piperidinone, 1-acetyl-2-azepanone, 1-vinyl-2-azepanone and 4-aminobutanoic acid.

The sulfur-containing organic compound can be one or more chosen from compounds comprising one or more chemical functional groups chosen from a thiol, thioether, sulfone or sulfoxide functional group. By way of example, the sulfur-containing organic compound can be one or more chosen from the group consisting of thioglycolic acid, 2,2'-thiodiethanol, 2-hydroxy-4-methylthiobutanoic acid, a sulfone derivative of a benzothiophene or a sulfoxide derivative of a benzothiophene, methyl 3-(methylthio)propanoate and ethyl 3-(methylthio)propanoate.

Preferably, the organic compound contains oxygen; preferably, it is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, gluconic acid, dimethyl succinate, glucose, fructose, sucrose, sorbitol, xylitol, γ-ketovaleric acid, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 5-methyl-2(3H)-furanone, 1-methyl-2-piperidinone and 4-aminobutanoic acid.

The contacting stage b) comprises several embodiments. They are distinguished in particular by the moment of the introduction of the organic compound when it is present and which can be carried out either at the same time as the impregnation of the compound comprising a metal from group VIb (coimpregnation), or after (postimpregnation), or before (preimpregnation). In addition, it is possible to combine the embodiments.

Advantageously, after each impregnation stage, whether it is a stage of impregnation of the metals and optionally of the phosphorus or of the organic compound, the impregnated support is left to mature.

Any maturation stage is advantageously carried out at atmospheric pressure, in a water-saturated atmosphere and at a temperature of between 17° C. and 50° C., and preferably at ambient temperature. Generally, a maturation time of between ten minutes and forty-eight hours and preferably of between thirty minutes and six hours is sufficient.

Any impregnation solution described in the present invention can comprise any polar solvent known to a person skilled in the art. Said polar solvent used is advantageously chosen from the group formed by methanol, ethanol, water, phenol and cyclohexanol, taken alone or as a mixture. Said polar solvent can also advantageously be chosen from the group formed by propylene carbonate, DMSO (dimethyl sulfoxide), N-methylpyrrolidone (NMP) and sulfolane, taken alone or as a mixture. Preferably, a polar aprotic solvent is used. A list of the usual polar solvents and their dielectric constants can be found in the book *Solvents and Solvent Effects in Organic Chemistry*, C. Reichardt, Wiley-VCH, $3^{rd}$ Edition, 2003, pages 472-474. Very preferably, the solvent used is water or ethanol and particularly preferably the solvent is water. In one possible embodiment, the solvent may be absent in the impregnation solution.

Drying (Stage c)

In accordance with the drying stage c) of the rejuvenation process according to the invention, the rejuvenated catalyst obtained in stage b) is subjected to a drying stage at a temperature of less than 200° C., advantageously of between 50° C. and 180° C., preferably between 70° C. and 150° C., very preferably between 75° C. and 130° C.

The drying stage is preferentially carried out under an inert atmosphere or under an oxygen-containing atmosphere. The drying stage can be carried out by any technique known to a person skilled in the art. It is advantageously carried out at atmospheric pressure or at reduced pressure. Preferably, this stage is carried out at atmospheric pressure. It is advantageously carried out in a traversed bed using hot air or any other hot gas. Preferably, when the drying is carried out in a fixed bed, the gas used is either air or an inert gas, such as argon or nitrogen. Very preferably, the drying is carried out in a traversed bed in the presence of nitrogen and/or of air. Preferably, the drying stage has a duration of between 5 minutes and 15 hours, preferably between 30 minutes and 12 hours.

According to a first alternative form and advantageously when an organic compound is present, the drying is carried out so as to preferably retain at least 30% by weight of the organic compound introduced during an impregnation stage; preferably, this amount is greater than 50% by weight and more preferably still greater than 70% by weight, calculated on the basis of the carbon remaining on the rejuvenated catalyst.

On conclusion of the drying stage c), a rejuvenated catalyst is then obtained, which catalyst will be subjected to an optional activation (sulfidation) stage for its subsequent use in a process for the hydrodesulfurization of gasolines.

Calcination (Optional Stage d))

According to another alternative form, on conclusion of the drying stage c), a calcination stage d) is carried out at a temperature of between 200° C. and 600° C., preferably of between 250° C. and 550° C., under an inert atmosphere (for example nitrogen) or under an oxygen-containing atmosphere (for example air). The duration of this heat treatment is generally between 0.5 hour and 16 hours, preferably between 1 hour and 5 hours. After this treatment, the active phase is thus found in the oxide form and the catalyst no longer contains or contains very little organic compound when it has been introduced. However, the introduction of the organic compound during its preparation has made it possible to enhance the dispersion of the active phase, thus leading to a more active and/or more selective catalyst.

Sulfidation (Optional Stage)

Before bringing into contact with the feedstock to be treated in a process for the hydrodesulfurization of gasolines, the rejuvenated catalyst of the process according to the invention generally undergoes a sulfidation stage. The sulfidation is preferably carried out in a sulforeducing medium, that is to say in the presence of $H_2S$ and hydrogen, in order to transform metal oxides into sulfides, such as, for example, $MoS_2$ and $Co_9S_8$. The sulfidation is carried out by injecting, onto the catalyst, a stream containing $H_2S$ and hydrogen, or else a sulfur compound capable of decomposing to give $H_2S$ in the presence of the catalyst and of hydrogen. Polysulfides, such as dimethyl disulfide (DMDS), are $H_2S$ precursors commonly used to sulfide catalysts. The sulfur can also originate from the feedstock. The temperature is adjusted in order for the $H_2S$ to react with the metal oxides to form metal sulfides. This sulfidation can be carried out in situ or ex situ (inside or outside the reactor) of the reactor of the process according to the invention at temperatures of between 200° C. and 600° C. and more preferentially between 300° C. and 500° C.

Hydrodesulfurization Process

The present invention also relates to a process for the hydrodesulfurization of a sulfur-containing olefinic gasoline cut in which said gasoline cut, hydrogen and the catalyst rejuvenated according to the process of the invention are brought into contact, said process being carried out at a temperature of between 200° C. and 400° C., preferably of between 230° C. and 330° C., a total pressure of between 1 and 3 MPa, preferably of between 1.5 and 2.5 MPa, an hourly space velocity (HSV), defined as being the flow rate by volume of feedstock relative to the volume of catalyst, of between 1 and 10 $h^{-1}$, preferably of between 2 and 6 $h^{-1}$, and a hydrogen/gasoline feedstock ratio by volume of between 100 and 1200 Sl/l, preferably of between 150 and 400 Sl/l.

The hydrodesulfurization process according to the invention makes it possible to transform the organosulfur compounds of a gasoline cut into hydrogen sulfide ($H_2S$) while limiting as much as possible the hydrogenation of the olefins present in said cut.

Feedstock to be Treated

The process according to the invention makes it possible to treat any type of sulfur-containing olefinic gasoline cut, such as, for example, a cut resulting from a coking, visbreaking, steam cracking or catalytic cracking (FCC, Fluid Catalytic Cracking) unit. This gasoline can optionally be composed of a significant fraction of gasoline originating from other production processes, such as atmospheric distillation (gasoline resulting from a direct distillation (or straight run gasoline)), or from conversion processes (coking or steam cracking gasoline). Said feedstock preferably consists of a gasoline cut resulting from a catalytic cracking unit.

The feedstock is a sulfur-containing olefinic gasoline cut, the boiling point range of which typically extends from the boiling points of the hydrocarbons having 2 or 3 carbon atoms (C2 or C3) up to 260° C., preferably from the boiling points of the hydrocarbons having 2 or 3 carbon atoms (C2 or C3) up to 220° C., more preferably from the boiling points of the hydrocarbons having 5 carbon atoms up to 220° C. The process according to the invention can also treat feedstocks having lower end points than those mentioned above, such as, for example, a C5-180° C. cut.

The sulfur content of the gasoline cuts produced by catalytic cracking (FCC) depends on the sulfur content of the feedstock treated by the FCC, the presence or not of a pretreatment of the feedstock of the FCC, as well as on the end point of the cut. Generally, the sulfur contents of the whole of a gasoline cut, in particular those originating from the FCC, are greater than 100 ppm by weight and most of the time greater than 500 ppm by weight. For gasolines having end points of greater than 200° C., the sulfur contents are often greater than 1000 ppm by weight; they can even, in certain cases, reach values of the order of 4000 to 5000 ppm by weight.

In addition, the gasolines resulting from catalytic cracking (FCC) units contain, on average, between 0.5% and 5% by weight of diolefins, between 20% and 50% by weight of olefins and between 10 ppm and 0.5% by weight of sulfur, generally less than 300 ppm of which of mercaptans. The mercaptans are generally concentrated in the light fractions of the gasoline and more specifically in the fraction, the boiling point of which is less than 120° C.

It should be noted that the sulfur compounds present in the gasoline can also comprise heterocyclic sulfur compounds, such as, for example, thiophenes, alkylthiophenes or benzothiophenes. These heterocyclic compounds, unlike mercaptans, cannot be removed by extractive processes. These sulfur compounds are consequently removed by a hydrotreating, which leads to their transformation into hydrocarbons and $H_2S$.

Preferably, the gasoline treated by the process according to the invention is a heavy gasoline (or HCN for Heavy Cracked Naphtha) resulting from a distillation stage aimed at separating a broad cut of the gasoline resulting from a cracking process (or FRCN for Full Range Cracked Naphtha) into a light gasoline (LCN for Light Cracked Naphtha) and a heavy gasoline HCN. The cut point of the light gasoline and of the heavy gasoline is determined in order to limit the sulfur content of the light gasoline and to make it possible to use it in the gasoline pool, preferably without additional post-treatment. Advantageously, the broad cut FRCN is subjected to a selective hydrogenation stage described below before the distillation stage.

The hydrodesulfurization process can be carried out in one or more reactors in series of the fixed bed type or of the ebullated bed type. If the process is carried out by means of at least two reactors in series, it is possible to provide a device for the removal of the $H_2S$ from the effluent resulting from the first hydrodesulfurization reactor before treating said effluent in the second hydrodesulfurization reactor.

The hydrodesulfurization process according to the invention is carried out in the presence of a rejuvenated catalyst.

It can also be carried out in the presence of a mixture of a rejuvenated catalyst and of a fresh catalyst or of a regenerated catalyst.

When the fresh or regenerated catalyst is present, it comprises at least one metal from group VIII, at least one metal from group VIb and an oxide support, and optionally phosphorus and/or an organic compound such as are described above.

The active phase and the support of the fresh or regenerated catalyst may or may not be identical to the active phase and to the support of the rejuvenated catalyst.

The active phase and the support of the fresh catalyst may or may not be identical to the active phase and to the support of the regenerated catalyst.

When the hydrodesulfurization process is carried out in the presence of a rejuvenated catalyst and of a fresh or regenerated catalyst, it can be carried out in a reactor of the fixed bed type containing several catalytic beds.

In this case, and according to a first alternative form, a catalytic bed containing the fresh or regenerated catalyst can precede a catalytic bed containing the rejuvenated catalyst in the direction of the circulation of the feedstock.

In this case, and according to a second alternative form, a catalytic bed containing the rejuvenated catalyst can precede a catalytic bed containing the fresh or regenerated catalyst in the direction of the circulation of the feedstock.

In this case, and according to a third alternative form, a catalytic bed can contain a mixture of a rejuvenated catalyst and of a fresh catalyst and/or of a regenerated catalyst.

In these cases, the operating conditions are those described above. They are generally identical in the different catalytic beds except for the temperature, which generally increases in a catalytic bed following the exothermicity of the hydrodesulfurization reactions.

When the hydrodesulfurization process is carried out in the presence of a rejuvenated catalyst and of a fresh or regenerated catalyst in several reactors in series of the fixed bed type or of the ebullated bed type, one reactor can comprise a rejuvenated catalyst while another reactor can comprise a fresh or regenerated catalyst, or a mixture of a rejuvenated catalyst and of a fresh and/or regenerated catalyst, and this in any order. It is possible to provide a device for the removal of the $H_2S$ from the effluent resulting from the first hydrodesulfurization reactor before treating said effluent in the second hydrodesulfurization reactor. In these cases, the operating conditions are those described above and may or may not be identical in the different reactors.

Selective Hydrogenation (Optional Stage)

According to one alternative form, the gasoline cut is subjected to a selective hydrogenation stage before the hydrodesulfurization process according to the invention.

Preferably, the gasoline treated by the hydrodesulfurization process according to the invention is a heavy gasoline resulting from a distillation stage aimed at separating a broad cut of the gasoline resulting from a cracking process (or FRCN for Full Range Cracked Naphtha) into a light gasoline and a heavy gasoline.

Advantageously, the broad cut FRCN is subjected to a selective hydrogenation stage described below before the distillation stage.

Said FRCN cut is treated beforehand in the presence of hydrogen and of a selective hydrogenation catalyst so as to at least partially hydrogenate the diolefins and to carry out a reaction for increasing the molecular weight of a part of the mercaptan (RSH) compounds present in the feedstock to give thioethers, by reaction with olefins.

To this end, the broad FRCN cut is sent to a selective hydrogenation catalytic reactor containing at least one fixed or moving bed of catalyst for the selective hydrogenation of the diolefins and for increasing the molecular weight of the mercaptans. The reaction for the selective hydrogenation of the diolefins and for increasing the molecular weight of the mercaptans is preferentially carried out on a sulfided catalyst comprising at least one element from group VIII and optionally at least one element from group VIb and an oxide support. The element from group VIII is preferably chosen from nickel and cobalt and in particular nickel.

The element from group VIb, when it is present, is preferably chosen from molybdenum and tungsten and very preferably molybdenum.

The oxide support of the catalyst is preferably chosen from alumina, nickel aluminate, silica, silicon carbide or a mixture of these oxides. Use is preferably made of alumina and more preferably still of high-purity alumina. According to a preferred embodiment, the selective hydrogenation catalyst contains nickel at a content by weight of nickel oxide (in NiO form) of between 1% and 12%, and molybdenum at a content by weight of molybdenum oxide (in $MoO_3$ form) of between 6% and 18% and a nickel/molybdenum molar ratio of between 0.3 and 2.5, the metals being deposited on a support consisting of alumina and for which the degree of sulfidation of the metals constituting the catalyst being greater than 50%.

During the optional selective hydrogenation stage, gasoline is brought into contact with the catalyst at a temperature of between 50° C. and 250° C., preferably between 80° C. and 220° C. and more preferably still between 90° C. and 200° C., with a liquid space velocity (LHSV) of between 0.5 $h^{-1}$ and 20 $h^{-1}$, the unit of the liquid space velocity being the liter of feedstock per liter of catalyst and per hour (l/l·h). The pressure is between 0.4 MPa and 5 MPa, preferably between 0.6 and 4 MPa and more preferably still between 1 and 2 MPa. The optional selective hydrogenation stage is typically carried out with a $H_2$/gasoline feedstock ratio of between 2 and 100 $Sm^3$ of hydrogen per $m^3$ of feedstock, preferably between 3 and 30 $Sm^3$ of hydrogen per $m^3$ of feedstock.

EXAMPLES

Example 1—Preparation of a Fresh Calcined Catalyst A (Comparative)

The support of the catalyst A is a transition alumina with a specific surface of 140 $m^2$/g and a pore volume of 1.0 $cm^3$/g. The catalyst A is prepared by dry impregnation of the support with an aqueous solution of ammonium heptamolybdate and of cobalt nitrate, the volume of the solution containing the precursors of the metals being strictly equal to the pore volume of the mass of support. The concentration of the metal precursors in aqueous solution is adjusted so as to obtain the desired percentage by weight of molybdenum, and of cobalt on the final catalyst. After dry impregnation on the support, the catalyst is left to mature for 1 h 30 in a water-saturated chamber, dried under air in an oven at 90° C. for 12 hours and then calcined under air at 450° C. for 2 hours.

The fresh catalyst A obtained after calcination has a content of 9.6% by weight of molybdenum ($MoO_3$ equivalent) and 2.2% by weight of cobalt (CoO equivalent). This catalyst exhibits a Co/Mo atomic ratio of 0.44 and a specific surface of 123 $m^2$/g.

Example 2—Preparation of a Regenerated Calcined Catalyst A (Comparative)

The fresh catalyst A is used to desulfurize a catalytic cracking (FCC) gasoline, the characteristics of which are collated in table 1. The reaction is carried out at 270° C. for 900 hours in a reactor of traversed bed type under the following conditions: P=2 MPa, HSV=4 h$^{-1}$, H$_2$/HC=300 liters/liters of hydrocarbon feedstock. The catalyst is pretreated at 350° C. with a feedstock containing 4% by weight of sulfur in the DMDS (dimethyl disulfide) form in order to provide the sulfidation of the oxide phases. The reaction takes place in an upward stream in an isothermal pilot reactor.

TABLE 1

| | |
|---|---|
| S ppm | 392 |
| Aromatics wt % | 41.3 |
| Paraffins wt % | 27.2 |
| Naphthenics wt % | 11.0 |
| Olefins wt % | 20.5 |
| T5° C. | 62 |
| T95° C. | 225 |

The spent catalyst A is withdrawn from the reactor on conclusion of the hydrodesulfurization of a catalytic cracking (FCC) gasoline described above. The spent catalyst A is subsequently washed with toluene in a Soxhlet at 250° C. for 7 hours (deoiling).

The regeneration of the spent/washed catalyst A is subsequently carried out in a tubular oven under dry air at 450° C. for 2 hours and the regenerated catalyst A is obtained. The residual carbon content of the regenerated catalyst A is zero.

Example 3—Preparation of a Calcined Rejuvenated Catalyst B1 by Addition of Co and Mo (not in Accordance)

The catalyst B1 is prepared by dry impregnation of the regenerated catalyst A with an aqueous solution of ammonium heptamolybdate and of cobalt nitrate, the volume of the solution containing the precursors of the metals being strictly equal to the pore volume of the mass of the regenerated catalyst A. The concentration of the metal precursors in aqueous solution is adjusted so as to obtain the desired percentage by weight of molybdenum and cobalt on the final catalyst. After dry impregnation on the regenerated catalyst A, the catalyst B1 is left to mature for 1 h 30 in a water-saturated chamber and dried under air in an oven at 90° C. for 12 hours, then calcined under air at 450° C. for 2 hours.

The catalyst B1 obtained after calcination has a content of 10.8% by weight of molybdenum (MoO$_3$ equivalent) and 2.4% by weight of cobalt (CoO equivalent), a Co/Mo atomic ratio of 0.43 and a specific surface of 122 m$^2$/g. The molar ratio of the metal from group VIb added per metal from group VIb already present in the regenerated catalyst A is 0.125 mol/mol.

Example 4—Preparation of a Dried Rejuvenated Catalyst B2 by Addition of Co and Mo (in Accordance)

The catalyst B2 is prepared by dry impregnation of the regenerated catalyst A with an aqueous solution of ammonium heptamolybdate and of cobalt nitrate, the volume of the solution containing the precursors of the metals being strictly equal to the pore volume of the mass of the regenerated catalyst A. The concentration of the metal precursors in aqueous solution is adjusted so as to obtain the desired percentage by weight of molybdenum and cobalt on the final catalyst. After dry impregnation on the regenerated catalyst A, the catalyst B2 is left to mature for 1 h 30 in a water-saturated chamber and dried under air in an oven at 90° C. for 12 hours.

The catalyst B2 obtained after drying has a content of 13.8% by weight of molybdenum (MoO$_3$ equivalent) and 3.6% by weight of cobalt (CoO equivalent), a Co/Mo atomic ratio of 0.50 and a specific surface of 116 m$^2$/g. The molar ratio of the metal from group VIb added per metal from group VIb already present in the regenerated catalyst A is 0.44 mol/mol.

Example 5—Preparation of a Calcined Rejuvenated Catalyst B3 by Addition of Co and Mo (in Accordance)

The catalyst B3 is obtained by calcination of the catalyst B2 under air at 450° C. for 2 hours.

Example 6—Preparation of a Rejuvenated Catalyst B4 by Addition of Co, Mo and P (According to the Invention)

The catalyst B4 is prepared by dry impregnation of the regenerated catalyst A with an aqueous solution of molybdenum oxide, of cobalt hydroxide and of orthophosphoric acid, the volume of the solution containing the precursors of the metals being strictly equal to the pore volume of the mass of the regenerated catalyst A. The concentration of the metal precursors in aqueous solution is adjusted so as to obtain the desired percentage by weight of molybdenum, cobalt and phosphorus on the final catalyst. After dry impregnation on the regenerated catalyst A, the catalyst B4 is left to mature for 1 h 30 in a water-saturated chamber and dried under air in an oven at 120° C. for 12 hours.

The catalyst B4 obtained after drying has a content of 12.4% by weight of molybdenum (MoO$_3$ equivalent), 2.6% by weight of cobalt (CoO equivalent) and 1.2% by weight of phosphorus (P$_2$O$_5$ equivalent), a Co/Mo atomic ratio of 0.40, a P/Mo atomic ratio of 0.20 and a specific surface of 117 m$^2$/g. The molar ratio of the metal from group VIb added per metal from group VIb already present in the regenerated catalyst A is 0.3 mol/mol.

Example 7—Preparation of a Rejuvenated Catalyst B5 by Addition of Co, Mo, P and Citric Acid (According to the Invention)

The catalyst B5 is prepared by dry impregnation of the regenerated catalyst A with an aqueous solution of molybdenum oxide, of cobalt hydroxide, of orthophosphoric acid and of citric acid, the volume of the solution containing the precursors of the metals being strictly equal to the pore volume of the mass of the regenerated catalyst A. The concentration of the metal precursors in aqueous solution is adjusted so as to obtain the desired percentage by weight of molybdenum, cobalt and phosphorus on the final catalyst. The citric acid to molybdenum molar ratio is 0.4 on the final catalyst. After dry impregnation on the regenerated catalyst A, the catalyst B5 is left to mature for 1 h 30 in a water-saturated chamber and dried under air in an oven at 120° C. for 12 hours.

The catalyst B5 obtained after drying has a content of 15.5% by weight of molybdenum (MoO$_3$ equivalent), 3.4% by weight of cobalt (CoO equivalent) and 2.4% by weight of phosphorus (P$_2$O$_5$ equivalent), a Co/Mo atomic ratio of 0.42, a P/Mo atomic ratio of 0.31 and a specific surface of 110 m$^2$/g. The molar ratio of the metal from group VIb added per metal from group VIb already present in the regenerated catalyst A is 0.61 mol/mol.

Example 8—Evaluation of the Catalytic Performance Qualities of the Catalysts a (Regenerated), B1, B2, B3, B4 and B5

A model feedstock representative of a catalytic cracking (FCC) gasoline containing 10% by weight of 2,3-dimethylbut-2-ene and 0.33% by weight of 3-methylthiophene (i.e. 1000 ppm by weight of sulfur in the feedstock) is used for the evaluation of the catalytic performance qualities of the various catalysts. The solvent used is heptane.

The hydrodesulfurization (HDS) reaction is carried out in a fixed traversed bed reactor under a total pressure of 1.5 MPa, at 210° C., at HSV=6 h$^{-1}$ (HSV=flow rate by volume of feedstock/volume of catalyst) and an H$_2$/feedstock ratio by volume of 300 Sl/l, in the presence of 4 ml of catalyst. Prior to the HDS reaction, the catalyst is sulfided in situ at 350° C. for 2 hours under a flow of hydrogen containing 15 mol % of H$_2$S at atmospheric pressure.

Each of the catalysts is placed successively in said reactor. Samples are taken at different time intervals and are analyzed by gas chromatography so as to observe the disappearance of the reactants and the formation of the products.

The catalytic performance qualities of the catalysts are evaluated in terms of catalytic activity and the selectivity. The hydrodesulfurization (HDS) activity is expressed from the rate constant for the HDS reaction of 3-methylthiophene (kHDS), standardized per the volume of catalyst introduced and assuming first order kinetics with respect to the sulfur compound. The hydrogenation of the olefins (HydO) activity is expressed from the rate constant of the hydrogenation reaction of 2,3-dimethylbut-2-ene, standardized per the volume of catalyst introduced and assuming first order kinetics with respect to the olefin.

The selectivity of the catalyst is expressed by the standardized ratio of the rate constants kHDS/kHydO. The kHDS/kHydO ratio will be higher the more selective the catalyst. The values obtained are standardized by taking the regenerated catalyst A as reference (relative HDS activity and relative selectivity equal to 100). The performance qualities are thus the relative HDS activity and the relative selectivity.

TABLE 2

| Catalysts | Relative HDS activity | Relative selectivity |
| --- | --- | --- |
| A (regenerated) (comparative) | 100 | 100 |
| B1 (comparative) | 101 | 98 |
| B2 (according to the invention) | 105 | 107 |
| B3 (according to the invention) | 109 | 107 |
| B4 (according to the invention) | 115 | 120 |
| B5 (according to the invention) | 122 | 135 |

The rejuvenated catalysts B2, B3, B4 and B5 exhibit greater activities and an improved selectivity in hydrodesulfurization with respect to the hydrogenation of the olefins, in comparison with the comparative catalysts A (regenerated) and B1.

This improvement in selectivity of the catalysts is particularly advantageous in the case of use in a process for the hydrodesulfurization of gasolines containing olefins for which it is desired to limit as much as possible the loss of octane due to the hydrogenation of the olefins.

The invention claimed is:

1. A process for the rejuvenation of an at least partially spent catalyst resulting from a process for the hydrodesulfurization of a sulfur-containing olefinic gasoline cut, said at least partially spent catalyst resulting from a fresh catalyst comprising cobalt and molybdenum, alumina, and optionally phosphorus, said process comprising the following stages:
   a) the at least partially spent catalyst is regenerated in an oxygen-containing gas stream at a temperature of between 350° C. and 550° C. so as to obtain a regenerated catalyst,
   b) the regenerated catalyst is brought into contact with an impregnation solution that consists of Mo and Co as impregnation metals and water,
      wherein the impregnation solution does not contain phosphorus or an organic additive,
      wherein the Mo in the impregnation solution is present as a molybdenum oxide, molybdenum hydroxide, ammonium molybdate, ammonium heptmolybdate, or a silicomolybdic acid,
      wherein the Co in the impregnation solution is present as a cobalt oxide, cobalt hydroxide, cobalt hydroxycarbonate, cobalt carbonate or a cobalt nitrate,
      wherein the molar ratio of the Mo added per Mo already present in the regenerated catalyst being between 0.15 and 2.5 mol/mol, and
      wherein the molar ratio of the Co added per Co already present in the regenerated catalyst being between 0.15 and 2.5 mol/mol,
   c) a drying stage is carried out at a temperature of less than 200° C. so as to obtain a rejuvenated catalyst.

2. The process as claimed in claim 1, in which the regeneration stage a) is preceded by a deoiling stage which comprises bringing the at least partially spent catalyst into contact with a stream of inert gas at a temperature of between 300° C. and 400° C.

3. The process as claimed in claim 1, in which, on conclusion of the drying stage c), a calcination stage d) is carried out at a temperature of between 200° C. and 600° C.

4. The process as claimed in claim 1, in which the fresh catalyst has a phosphorus content of between 0.3% and 10% by weight, expressed as P$_2$O$_5$, with respect to the total weight of the catalyst and the phosphorus/(Mo) molar ratio in the catalyst is between 0.1 and 0.7.

5. The process as claimed in claim 1, in which the fresh catalyst is characterized by a specific surface of between 20 and 200 m$^2$/g.

6. The process as claimed in claim 1, in which the rejuvenated catalyst is subjected to a sulfidation stage before or during the hydrodesulfurization process.

7. The process as claimed in claim 1, in which the fresh catalyst is characterized by a specific surface of between 30 and 180 m$^2$/g.

8. The process as claimed in claim 1, in which the molar ratio of the Mo added per Mo already present in the regenerated catalyst is between 0.2 and 2.0 mol/mol.

9. The process as claimed in claim 1, in which the molar ratio of the Mo added per Mo already present in the regenerated catalyst is between 0.3 and 1.0 mol/mol.

10. The process as claimed in claim 1, in which the molar ratio of the Co added per Co already present in the regenerated catalyst is between 0.2 and 2.0 mol/mol.

11. The process as claimed in claim 1, in which the molar ratio of the Co added per Co already present in the regenerated catalyst is between 0.3 and 1.0 mol/mol.

12. The process as claimed in claim 1, in which the molar ratio of the Co added per Co already present in the regenerated catalyst is between 1.0 and 2.5 mol/mol.

13. The process as claimed in claim 1, in which the Mo to Co molar ratio of the fresh catalyst is between 0.1 and 0.8.

14. A process for the rejuvenation of an at least partially spent catalyst resulting from a process for the hydrodesulfurization of a sulfur-containing olefinic gasoline cut, said at least partially spent catalyst resulting from a fresh catalyst comprising cobalt and molybdenum, alumina, and optionally phosphorus, said process comprising the following stages:
a) the at least partially spent catalyst is regenerated in an oxygen-containing gas stream at a temperature of between 350° C. and 550° C. so as to obtain a regenerated catalyst,
b) the regenerated catalyst is brought into contact with an impregnation solution that consists of Mo and Co as impregnation metals and water,
wherein the impregnation solution does not contain phosphorus or an organic additive,
wherein the Mo in the impregnation solution is present as a molybdenum oxide, molybdenum hydroxide, ammonium molybdate, ammonium heptmolybdate, or a silicomolybdic acid,
wherein the Co in the impregnation solution is present as a cobalt oxide, cobalt hydroxide, cobalt hydroxycarbonate, cobalt carbonate or a cobalt nitrate,
wherein the molar ratio of the Mo added per Mo already present in the regenerated catalyst being between 0.15 and 2.5 mol/mol, and
wherein the molar ratio of the Co added per Co already present in the regenerated catalyst being between 0.15 and 2.5 mol/mol,
c) a drying stage is carried out at a temperature of less than 200° C. so as to obtain a rejuvenated catalyst,
in which the fresh catalyst has a content of Mo of between 1% and 20% by weight of oxide of said Mo, with respect to the total weight of the catalyst and a content of Co of between 0.1% and 10% by weight of oxide of said Co, with respect to the total weight of the catalyst.

* * * * *